United States Patent Office 2,868,815
Patented Jan. 13, 1959

2,868,815

TREATMENT OF POLY-UNSATURATED FATTY ACIDS

William S. Baldwin, St. Paul, Don E. Floyd, Robbinsdale, and Raymond F. Paschke, Anoka, Minn., assignors to General Mills, Inc., a corporation of Delaware No Drawing. Application May 7, 1956
Serial No. 582,933

3 Claims. (Cl. 260—413)

The present invention relates to the treatment of unsaturated fatty acids at elevated temperatures in the presence of certain hydrogen transfer catalysts, whereby the unsaturated fatty acids change to forms which have much lower iodine numbers than the original materials. During the treatment two major changes are involved: (1) intramolecular cyclization within the unsaturated fatty acid chain through additions involving one or more double bonds; (2) aromatization of the cyclized molecules to give carboxylic acids containing aromatic rings. Hydrogen released during the aromatization may be released as such, or may reduce double bonds present in the unsaturated material.

This application is a continuation-in-part of our earlier filed application entitled "Treatment of Unsaturated Fatty Acids," Serial Number 275,246, filed March 6, 1952, and now abandoned.

It is an object of the present invention to provide a novel process of treating poly-unsaturated fatty acids at elevated temperatures in the presence of certain hydrogen transfer catalysts to effect a reduction in the iodine number of the material.

It is another object of the present invention to provide the novel product produced by the process herein described.

The invention is applicable primarily with linoleic acid compounds, i. e., pure linoleic acid, its esters, complex mixtures of fatty acids containing a preponderance of poly-unsaturated acids and various common derivatives of linoleic acid such as its nitriles and amines. These compounds or mixtures are best characterized by reference to their iodine number, which is the number of grams of halogen expressed as iodine absorbed by a 100 gram sample. For the purpose of this invention, these mixtures should have an iodine number of at least 130 and preferably 150. Of course, linolenic acid or more highly unsaturated fatty acids are other naturally occurring poly-unsaturated acids which may be used in accordance with the teachings of this invention. However, as a practical matter the primary source of poly-unsaturated monocarboxylic acids containing 18 carbon atoms having sufficient unsaturation for the purposes of this invention will be linoleic acid compounds. A ready source of linoleic acid are naturally occurring oils which have a relatively high iodine number. Illustrative oils are soybean oil, safflower oil, peanut oil, sunflower oils, fish oils etc.

Where poly-unsaturated fatty acids are employed alone, as for example, linoleic acid, the reaction results in intramolecular cyclization of the fatty acid chain, followed by the aromatization of the cyclized molecule. Hydrogen released during the aromatization may reduce double bonds present in additional portions of the starting material or in non-aromatic cyclic material, and accordingly the reaction mixture may contain the cyclized products plus some monoolefinic acids and some stearic acid. Where the starting material contains some monounsaturated fatty acid material, any hydrogen liberated from the aromatization may reduce the monounsaturated material to saturated material.

The process involves the treatment of one of the above-mentioned fatty acid materials with an active noble metal hydrogen transfer catalyst at about 270° C. in the substantial absence of added hydrogen and in the substantial absence of hydrogen donors. Some few degrees of temperature variation are possible but at temperatures below 250° C., conjugation and elaidinization of double bonds occur, and cyclization and aromatization do not proceed with any reasonable degree of speed, and at temperatures above 290° C., considerable polymerization is likely to be obtained. For example, 50 g. of the methyl esters of safflower oil fatty acids heated for 4 hours at 180° C. in the presence of 3 g. of 10% palladium-on-charcoal catalyst showed formation of 18% of conjugated diene unsaturation; infrared analysis showed the presence of both conjugated and unconjugated trans double bonds.

The reaction may be conducted at atmospheric pressure, under reduced pressure, or at superatmospheric pressure. It is desirable, although not absolutely necessary, to blanket the mass with inert gas when heated at atmospheric pressure or at superatmospheric pressure.

It will be recognized that various active noble-metal hydrogen transfer catalysts may be employed in accordance with the teachings of this invention. By the use of this class of catalysts it is possible to obtain high yields of 25% and above of the aromatized acids which contain a characteristic and strong infrared adsorption band in the 13.3μ region. Illustrative catalysts are palladium, palladium salts, platinum oxides and platinum. Because these catalysts are expensive their use can be extended by using them on various relative inexpensive carriers. Illustrative inexpensive carriers are carbon, activated carbon, chromium oxide, molybdenum oxide and alumina.

The time period will depend upon the temperature and the amount of catalyst employed. Usually the reaction is carried out until an iodine number of 50 or less is obtained.

The aromatization products produced by this invention are illustrated by the following structural formula, which is derived from a $C_{18}$ fatty acid ester.

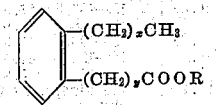

in which the sum of $x$ and $y$ in any one molecule is equal to 10 and $y$ is at least 5 and less than 8 and R is hydrogen or a lower alkyl radical containing less than 4 carbon atoms. As this structure has been unequivocally established it fully explains the unexpected drop in iodine value of the materials which are treated in accordance with the present teachings. For although the resulting ortho-substituted aromatized acids have 3 double bonds in their aromatic nucleus, none of these double bonds will absorb halogen under the conditions employed in the analytical determination of an iodine number. Likewise, it will be seen that linoleic acid must give up two molecules of hydrogen in the formation of the above aromatic acid. This hydrogen is then available to hydrogenate monounsaturated acids present or unaromatized poly-unsaturated acids and probably accounts for the resulting disproportionated product. It will also be appreciated that the —COOR group in the above formula may be replaced with any of the functional group —COOH, —C≡N, and —CH₂NH₂.

This invention may be further illustrated by reference to the following examples:

Example I

A stainless steel autoclave was charged with 15 g. of

10% palladium on charcoal catalyst and 300 g. of a mixture of fatty acids derived by the fractional distillation of tall oil, the mixture containing 44.2% linoleic acid, 7% saturated acids, 1.3% rosin, 2.4% of unsaponifiable material, and 45.1% (by difference) of oleic acid. The autoclave was flushed with nitrogen and sealed. The contents were heated to 270° C. and held at that temperature for 6 hours. The reaction mixture was cooled and diluted with 400 ml. of a petroleum solvent (Skellysolve C). The catalyst was filtered off and the solvent distilled from the filtrate. The effect of the treatment on linoleic acid content and iodine number is as follows:

|  | Original Fatty Acids | Reaction Product |
|---|---|---|
| Linoleic acid content, percent | 44.2 | 0 |
| Iodine number | 125.5 | 30.7 |

A portion of the product was distilled under reduced pressure in an alembic still, which left a residue of 4.5% indicating that the extent of polymerization during the reaction was relatively slight.

182.3 grams of the distillate from the reaction product were esterified as follows: 1400 ml. of methanol and 10 ml. of concentrated sulfuric acid were added and the reaction mixture heated under reflux in the usual manner. There was obtained 165 g. of esterified material. 140 grams of this material were subjected to fractional distillation using a Podbielniak Hyper-Cal column at a head pressure of 4.5–5 mm. and a reflux ratio of 10 to 1. Fractions 1 to 15 were collected and analyzed. The fractions were selected as much as possible at constant boiling levels. The results obtained are shown in the following table:

| Fraction No. | Weight, g. | B. P., °C./5 mm. | Iodine No. | Saponification No. | $n_D^{45}$ |
|---|---|---|---|---|---|
| 1 | 2.18 | 114–131 | 70.8 |  | 1.4453 |
| 2 | 10.32 | 131–125 | 72.7 | 3.2 | 1.4380 |
| 3 | 3.68 | 125–136 | 61.5 | 4.0 | 1.4350 |
| 4 | 8.84 | 136–140 | 37.0 | 2.0 | 1.4353 |
| 5 | 3.20 | 140–164 | 19.3 | 118.1 | 1.4440 |
| 6 | 5.44 | 164–170 | 13.5 | 186.0 | 1.4390 |
| 7 | 4.36 | 170–181 | 45.3 | 167.5 | 1.4550 |
| 8 | 5.85 | 181–187 | 42.4 | 176.8 | 1.4510 |
| 9 | 11.58 | 187–186 | 29.7 | 186.1 | 1.4482 |
| 10 | 10.82 | 187–187 | 25.3 | 188.4 | 1.4470 |
| 11 | 9.61 | 187–188 | 21.9 | 189.4 | 1.4472 |
| 12 | 11.08 | 188–186 | 19.3 | 190.2 | 1.4467 |
| 13 | 10.54 | 186–183 | 17.1 | 190.5 | 1.4471 |
| 14 | 7.69 | 183–146 | 13.9 | 189.5 | 1.4490 |
| 15 | 21.95 | Pot residue; not enough to push through column. | | | |

Fraction 15 was saved and distilled without a column, using an alembic still, as shown below:

|  | Weight, g. | B. P., °C./.03 mm. | Iodine No. | Saponification No. | $n_D^{45}$ |
|---|---|---|---|---|---|
| Distillate from pot residue | 20.2 | 127–134 | 25.7 | 176.8 | 1.4771 |

The preceding table shows that the first four fractions totaling about 18% consisted largely of low-boiling unsaponifiable material. Fraction 5 was an intermediate fraction, while fraction 6 consisted largely of methyl palmitate. Fractions 7 and 8 were intermediate fractions containing methyl palmitate, methyl oleate, and unsaponifiables. Fractions 9 to 14 were composed of mixtures of methyl oleate and methyl stearate with the ratio of stearate to oleate increasing in the later fractions. Fraction 14 also contained a little of the material later found concentrated in fraction 15. This is indicated by the refractive index. The oleate and stearate mixtures accounted for about 43.5% of the total.

The final fraction (No. 15) amounted to 15–16% of the total and had very unusual properties—a combination of low iodine number, very high refractive index, and a boiling point just higher than methyl stearate, indicating the presence of aromatic constituents. Since aromatic or cyclic compounds do not form adducts with urea, while straight chain aliphatic compounds do, this fraction was treated with urea (in methyl isobutyl ketone solvent). The filtrate material, containing products which did not form adducts with urea, was recovered. From 12.96 g. of fraction 15 distillate there was obtained 9.8 g. of concentrate. A portion (5.9 g.) of this concentrate was saponified by boiling with alcoholic potassium hydroxide, and the unsaponifiable material (amounting to 0.65 g.) was removed by extracting the diluted soap solution with ether. The soaps were acidulated to give 4.7 g. of purified acids. These acids re-esterified with 40 g. of methanol in the presence of 1 drop of concentrated sulfuric acid. The isolated liquid methyl esters from the esterification weighed 4.4 g. and had the following characteristics:

Saponification No. _____ 192.8.
Iodine No. _____ 9.4.
$n_D^{30}$ _____ 1.4862.
Ultraviolet analysis _____ No linoleic acid present; spectral evidence for benzene ring.
Infrared analyses _____ Evidence for presence of an aromatic ring.

*Example II*

Methyl linoleate having a refractive index of $$n_D^{30} = 1.4571$$

and an iodine number of 170.5 was prepared from safflower oil.

200 g. of this methyl linoleate was heated at 270°±5 for 6 hours in the presence of 10 g. of palladium on charcoal. The palladium on charcoal catalyst was 10% by weight palladium. This treatment resulted in a reaction mixture having a refractive index of $n_D^{30} = 1.4625$ and an iodine number of 43.9.

The reaction mixture of esters after being washed with methanol and hexane and filtered totalled 170 g. of a clear, light-colored ester. This purified mixture was then separated into two fractions with urea. The urea adduct fraction totalled 68 g. of a mono-olefinic ester and 31.6 g. methyl stearate. The non-adduct fraction had a refractive index of $n_D^{30} = 1.4868$ and contained 46 g. monomeric aromatized fatty acids and 11.9 g. of a polymeric product.

The 46 gm. fraction of aromatized monomeric acid had an I. V. of 3.2 and a saponification number of 192.7. This fraction was purified further by distillation in a Podbielniak miniature Hypercal column at 15 mm. pressure. Of the 20 fractions collected, fractions 2 to 16 had similar infrared spectra. The characteristic portion of these spectra was that they all had a strong band in the region of 13.3μ.

Fraction 13 from the Podbielniak distillation was oxidized to phthalic acid with $KM_nO_4$.

Phthalic acid was definitely identified by crystallization from carbon tetrachloride and a mixed melting point with known phthalic acid taken. The melting point of pure phthalic acid is 131.0–131.6 and the mixture melted at 130.0–130.8 which is conclusive of the presence of phthalic acid. This was confirmed by the preparation of phthalimide by heating the oxidized products from above with concentrated $NH_4OH$ which resulted in a compound having a melting point of 225–230° C. A mixture of pure phthalimide having a melting point of 233–234° C. was mixed with the phthalimide prepared above after crystallization from toluene and the mixed melting point was 232.0–233.5.

The aromatized acids and esters as well as their corresponding salts prepared in accordance with this invention may be used in the same applications as other monocarboxylic acids and their derivatives. Illustrative uses in which they may be employed are in the plasticizing of vinyl compounds such as polyvinyl chloride, as an oil additive to improve its viscosity index, and as surface active agents such as soaps. The aromatized acids have lower melting points than ordinary fatty acids which will permit their use in many applications in which ordinary fatty acids are unsuitable. Furthermore, the aromatic ring undergoes the typical reactions of aromatic compounds, e. g., nitration, diazotization, sulfonation, halogenation etc.

Now, therefore, we claim:

1. Process of aromatizing a linoleic acid compound which comprises heating a compound selected from the group consisting of linoleic acid and its esters to about 270° C. in the presence of a noble metal active hydrogen transfer catalyst to produce a mixture of aromatic ortho-substituted di-alkyl monocarboxylic acids which are characterized by having a strong infrared adsorption band in the 13.3$\mu$ region.

2. Process of aromatizing a polyunsaturated higher fatty acid compound which comprises heating a compound selected from the group consisting of polyunsaturated higher fatty acid and its esters to about 270° C. in the presence of a noble metal active hydrogen transfer catalyst to produce a mixture of aromatic ortho-substituted di-alkyl monocarboxylic acids which are characterized by having a strong infrared adsorption band in the 13.3$\mu$ region.

3. A method of aromatizing poly-unsaturated acids which comprises heating naturally occurring aliphatic carboxylic acids and their esters having an iodine number greater than 130 and containing 18 carbon atoms in the presence of a noble metal active hydrogen transfer catalyst to produce a mixture of mono-carboxylic acids having an iodine value of less than 50 and in which at least 25 percent of said acids contain an aromatic nucleus and have a strong infrared adsorption band in the 13.3$\mu$ region.

References Cited in the file of this patent

FOREIGN PATENTS 646,919    Great Britain _____ Nov. 29, 1950

OTHER REFERENCES

Tuck et al.: "Oil and Soap," vol. 21, No. 11 (1944), pp. 321–322.